(No Model.)

2 Sheets—Sheet 1.

W. B. POTTER.
ELECTRIC BRAKE.

No. 540,685.

Patented June 11, 1895.

WITNESSES.
A. F. Macdonald.
R. B. Hull.

INVENTOR.
William B. Potter
by
Geo. R. Blodgett,
Atty.

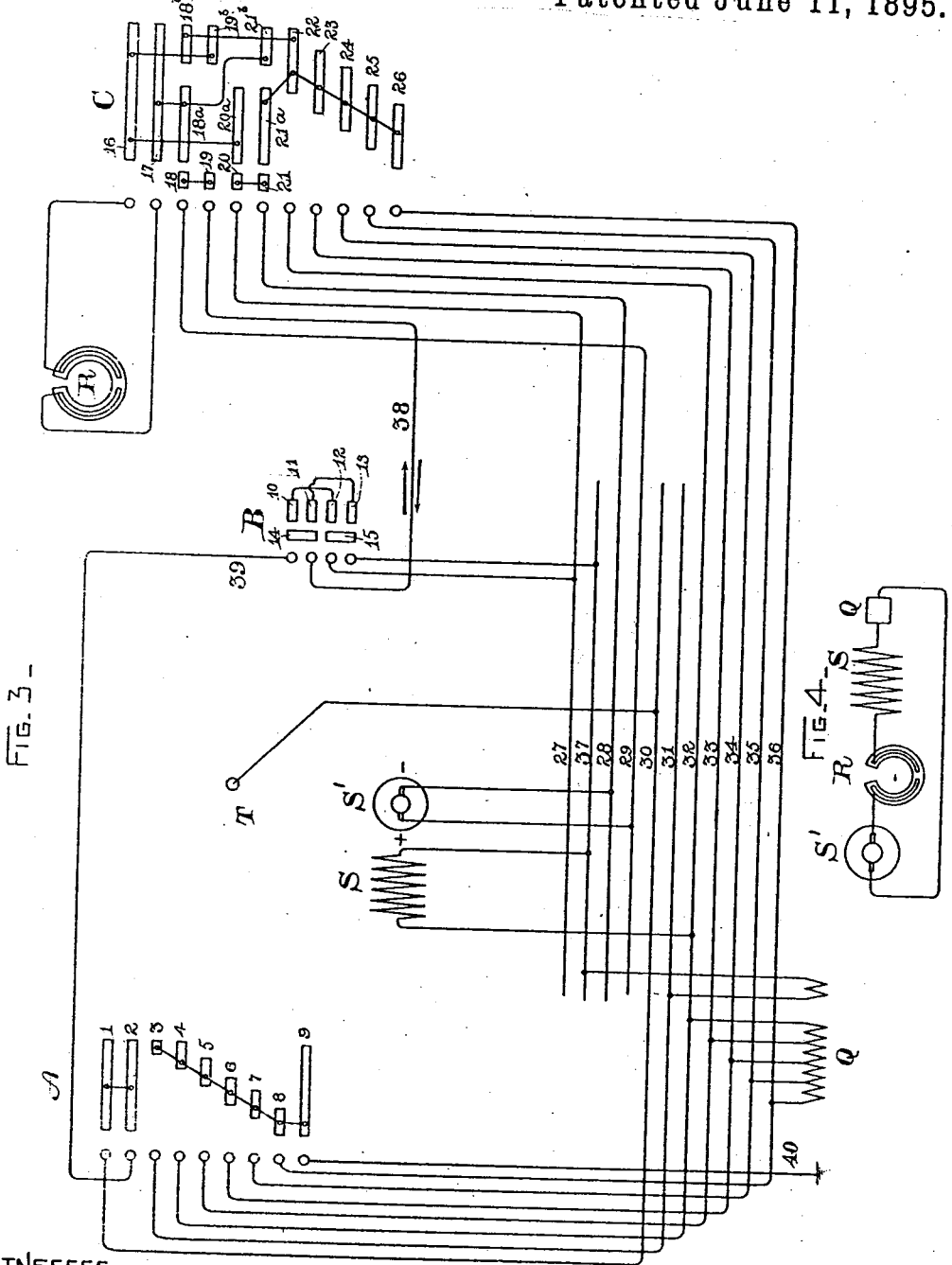

UNITED STATES PATENT OFFICE.

WILLIAM B. POTTER, OF SCHENECTADY, NEW YORK, ASSIGNOR TO THE GENERAL ELECTRIC COMPANY, OF NEW YORK.

ELECTRIC BRAKE.

SPECIFICATION forming part of Letters Patent No. 540,685, dated June 11, 1895.

Application filed March 9, 1895. Serial No. 541,094. (No model.)

*To all whom it may concern:*

Be it known that I, WILLIAM B. POTTER, a citizen of the United States, residing at Schenectady, in the county of Schenectady, State of New York, have invented certain new and useful Improvements in Electric Brakes, of which the following is a specification.

My invention relates to electrically operated braking mechanism for vehicles of one description or another, and particularly for tramways; and consists in certain improved details of construction calculated to make the operation of the apparatus easy and certain and to prevent accidents by improper manipulation.

An embodiment of my invention is illustrated in the accompanying drawings, in which—

Figure 1:
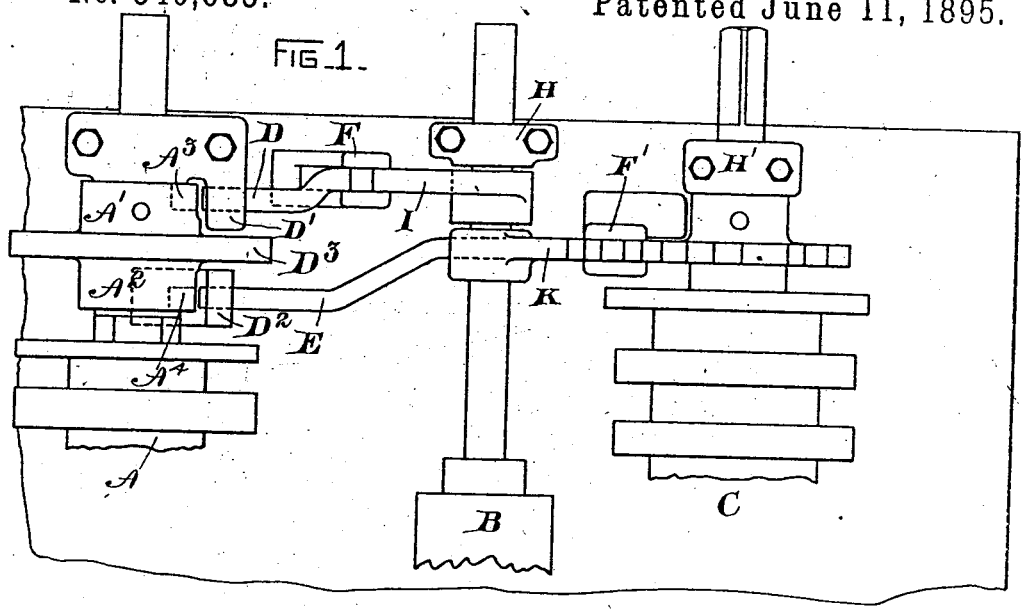
Figure 2:
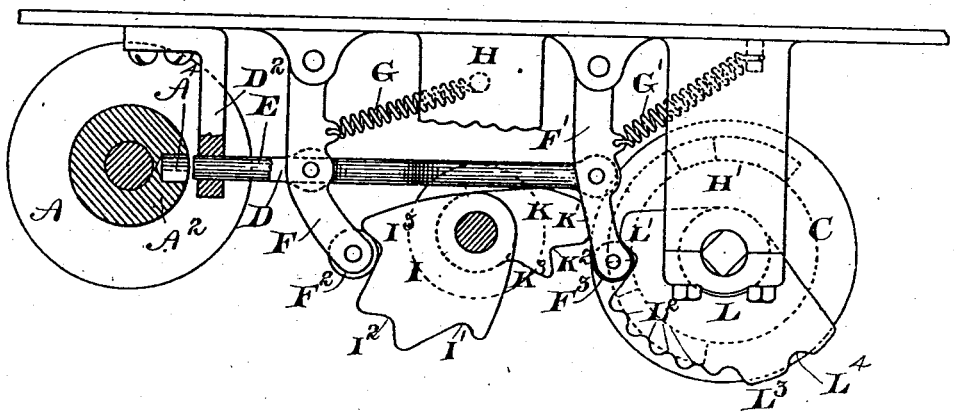

Figure 1 is a front elevation, partly broken away, of a controller for my improved braking apparatus. Fig. 2 is a plan view of the parts shown in Fig. 1, and Figs. 3 and 4 are diagrams of the circuits.

The improved braking apparatus is adapted to be operated by the current from the motors when these have been reversed and act as generators by the momentum of the car. This particular arrangement, however, is not my invention, as it has been employed by others.

In general the controller may be said to consist of three switches or cylinders,—a power cylinder, or controlling cylinder for the motors when operating as motors; a brake cylinder, or controlling cylinder for the motors when reversed and operating as generators, and a reversing cylinder, which is sometimes desirable when the car is to be propelled backward for a short distance, as in entering a switch or turn-out. These three cylinders are provided with separate handles; and I also provide in my apparatus interlocking mechanisms designed to prevent improper manipulation of the three handles. I also so arrange the interlocking mechanism of the three switches that a different throw is permitted to the brake-switch cylinder when the car is going in one direction from that allowed when the car is going in the opposite direction. Under ordinary circumstances, it is unnecessary to have the brake operate when the car is running backward, inasmuch as it is not permitted on most roads to run the car backward for any distance, the motorman being required to go to the front platform relative to the direction in which the car is traveling; but it sometimes occurs that in running the car backward for a few feet, as in running on a switch or turn-out, it may become necessary to stop it abruptly; and for making such emergency stops, I arrange the brake so that, although there are successively graduated effects in applying it when the car is running forward, this part of the cylinder will be idle when the car is running backward, and an auxiliary set of contacts will come into play, which put the brake on with full force at once.

I do not in this application claim the use of an emergency stop generally, the stop being controlled by the braking switch ordinarily used for applying the brake making other stops, inasmuch as that matter is shown and claimed in my application, Serial No. 543,803, filed March 30, 1895. The claims in this case are, therefore, to be limited to the use of the stop in the manner described; that is, in running backward only and when no other electric braking apparatus is in use.

The general construction of my controller resembles in some particulars that shown in my pending application, Serial No. 535,430, filed January 19, 1895, but differs therefrom in matters of detail; and it also differs therefrom in that, in that application, I have shown and described a series-parallel controlling switch for the motors, whereas in this application I employ an ordinary resistance switch. In both, however, I have shown contacts upon the braking switch cylinder co-operating with the controlling cylinder proper. These connecting contacts form an important economy in the car wiring, inasmuch as by them I am enabled to save a considerable length of wire in equipping the circuits of the apparatus. The brake-shoe which I prefer to use is illustrated diagrammatically, and is by preference of the form shown in my application already referred to.

In Fig. 1, A is the controlling cylinder, a development of the contacts of which is shown in Fig. 3. B is the reversing cylinder or switch also diagrammed in Fig. 3; and C is the braking switch. Shown on the right in Fig. 3. The circuits will be more fully described in connection with the latter figure.

Referring still to Figs. 1 and 2, D is a bolt serving as an interlock between the reversing switch and controlling switch, as presently described. E is a second bolt connecting the braking switch and the controlling switch. D' is a lug forming a bearing for the bolt D. D² is a similar lug forming a bearing for the bolt E. A' is a collar formed integrally with another collar A² surrounding the shaft of the controlling switch A. In these collars are notches A³, A⁴, with which the ends of the bolts D and E may register. These notches indicate the off position of the controlling switch, in which no current passes to the motor, and it is only in this position that it is possible to operate either of the other switches B, C. D³ is a disk provided with notches, and an engaging pawl so as to give a step-by-step motion to the controlling switch. These are not indicated in the drawings, as this is a well known device and its omission makes the construction more clear.

Referring to Fig. 2, upon the shaft of the reversing switch is affixed a cam I provided with notches I', I², I³. With these notches the cam roller F² carried upon the pawl F, coöperates. The spring G is affixed to the pawl and also to the lug H, which forms, as indicated in Fig. 1, a bearing for the shaft of the reversing switch. Upon the brake switch C is a step-by-step motion cam L provided with notches L', L², L³, L⁴. With these notches coöperates the cam roller F³ upon the pawl F' provided with a spring G' secured to a projecting lug. The lug H' serves as a bearing for the shaft of the switch cylinder C. The bolt E is fast to the pawl F', and the bolt D is fast to the pawl F. As thus arranged, the operation of the reversing switch while the controlling switch is at the off position would force the bolt D into the notch A³ and hold the controlling switch from rotation until the reversing switch had been completely thrown; and the operation of the brake switch similarly would hold the controlling switch at its off position. To prevent the operation of the braking switch, however, while the reversing switch is being thrown, I provide a second cam K upon the shaft of the reversing switch B, the cam provided with projecting lugs and notches K', K², K³. When the reversing switch is thrown, this cam engages with the roller F³ of the pawl F', which at this time is in the deep notch L' of the cam L and effectually locks the brake switch against rotation. It is by the operation of these parts that I obtain the emergency stop for use when running the car backward, and permitting the ordinary graduated stops when the car is running forward. The part K' of the cam K does not abut against the pawl F', but the pawl is so arranged as to permit it to pass over the cam until the cam roller F³ abuts against the lug or projection K³ of the cam K. I prefer to accomplish this by making the pawl with a slot permitting this part of its movement, but it might be accomplished by setting the roller upon a stud upon one face of the pawl, or in any other way, and still be within my invention. When the roller F³ is touching the lug K³, it can play back and forth in the notches L² of the cam L as the cylinder C is rotated, there being just enough space left between the outer radius of the projections between these notches and the lug K³ to permit of this. The radius of the portion L³ of the cam L is, however, slightly greater than that of the projections named, and therefore the roller F³ cannot pass this projection L³. When the reversing switch is thrown and the cam roller F² is in the notch I² of the cam I, the part K' of the cam K registers with the cam roller F³ of the pawl F' (which is then in the notch L') and thus locks the cylinder C against rotation; but when the roller F² registers with the notch I' of the cam I, the cam K is swung out of the way of the pawl F' entirely, and in this position the pawl has free play and the cam roller F³ can pass the lug L³ and come into the notch L⁴. The contacts and cross-connections by means of which I am enabled to get the emergency stop, in the backward position only as outlined in my statement of invention, will be referred to in describing Fig. 3. When the controlling switch is in other than its off position, the bolts D and E no longer register with the notches A³, A⁴, and the operation of either of the other switches is thereby prevented.

In the claims appended to this description I have used the term "vary the effect of the interlock," as applied to the mechanism just described; and by that term I mean to express the fact that the position of one of the switches so changes the action of the interlocking mechanism, that a different operation is permitted for one of the other switches when the switch varying the effect of the interlock is in one position, from that permitted when it is in its other position. This I have illustrated particularly with reference to the reversing switch, and in this particular application this will be found the most useful way in which to apply it; but as it is manifest that this principle may be applied in other switches and other combinations, and as I believe it to be broadly new, I do not wish to be limited to this particular arrangement.

Referring to Fig. 4, I show in diagrammatic form the circuits as employed in my improved brake. As will be seen, it consists of a motor, brake-shoe and resistance in series. It is to be understood that the resistance is variable or regulable. In that figure, S' represents the armature of the motor. R represents the brake-shoe, S the motor field-magnet, and Q the resistance.

Referring to Fig. 3, I show the circuits of my improved braking apparatus. Therein A is the controlling switch, B the reversing switch, and C the brake switch. The contact-plates of the switches I have numbered from 1 to 26. I have not (to avoid confusion) numbered the co-operating contacts, as the circuits are readily traced. As before, S' is the motor armature; S, the motor field-magnet; R, the brake-shoe; Q, the resistance (which in this case is employed both to regulate the action of the motors and their action as generators in the braking apparatus). T is the trolley.

When the motors operate to propel the car, the circuit is as follows: Entering from the trolley T, the current passes by the lead 30 to the contact-plate 1 upon the controlling switch A, thence by cross-connection to the contact-plate 2, thence by the lead 39 to the reversing switch B, entering at the contact-plate 14, passing by the lead 38 to the contact-plate 19 upon the brake switch C, by cross-connection to contact-plate 18, thence by the lead 29 to one of the armature terminals, through the armature to the lead 28, to contact-plate 21 upon the brake switch cylinder, to contact-plate 20, by the lead 27 to the reversing switch, to contact-plate 15, to the lead 37, through the field-magnet S of the motor to the lead 32, through the resistance Q to the lead 36, thence to contact-plate 8 upon the controlling cylinder A, by cross-connection to contact-plate 9, and by the lead 40 to ground.

It will be readily understood that the office of the contact-plates 3, 4, &c., is merely to cut out additional sections of the resistance and regulate the speed of the motors in the ordinary way. When, however, the switch A is off, and the leads connecting with it are open-circuited at that switch, the switch C may be operated and the contact-plates 16 and 17, &c., thrown into action. The path of the current in this case is represented diagrammatically in Fig. 4 and is as follows: Leaving the brush marked + of the motor armature S', it passes to the lead 29, to the contact-plate 18ᵃ, by cross-connection to the contact-plate 17, through the brake-shoe, to the contact-plate 16, to contact-plate 20ᵃ by the cross-connection, by the lead 27 to contact-plate 15 upon the reversing switch B, by the lead 37, through the field-magnet S of the motor, to the lead 32, through the resistance Q, by the lead 36 to the contact-plate 26 upon the brake switch, by cross-connection to contact-plate 22, and by cross-connection from that plate to contact-plate 21ᵃ; thence by the lead 28 to the other side of the motor armature S'. Further rotation of the brake switch acts, by means of the contacts 22 to 26, to cut out sections of the resistance, regulating the amount of current passing through the brake-shoe and its consequent attraction for the co-operating disk in a well known way.

The office of the contacts 18ᵇ, 19ᵇ, &c., is understood by referring again to the construction of the cam L in Fig. 2; those contacts being thrown into action when the cam roller F³ passes the projection L³ (which ordinarily acts as a stop to the roller), and falls into the notch L⁴. In this case the cam roller F² is in the notch I' of the cam I; or, in other words, referring to Fig. 3, the contacts 10, 11, 12 and 13, upon the reversing switch B are in action. The circuits are as follows: Passing in this instance, from the minus side of the armature, the current passes by the lead 28 to the contact 21ᵇ, by cross-connection to contact-plate 17, through the brake-shoe R to contact-plate 16, by cross-connection to contact-plate 19ᵇ, by the lead 38 to the contact-plate 11 upon the reversing switch B, by cross-connection to contact-plate 13, by the lead 37 through the field-magnet S of the motor, to the lead 32, to contact-plate 22, by cross-connection to the contact-plate 18ᵇ, and by the lead 29 to the other side of the motor armature S'. In this position it will be observed that the path of the current is not at any time through the resistance Q, and, as already explained, it is designed to be used only as an emergency stop when the object is to bring the car to an immediate standstill. In all the circuits, the current passes in the same direction through the field S of the motor. As is well understood in the art, this is necessary to prevent the field being demagnetized, which would make the machines cease to generate current.

I have illustrated and described only one motor and one controlling apparatus, but it is manifest that two or more motors may be employed, and that ordinarily a controlling apparatus would be situated at each end of the car.

What I claim as new, and desire to secure by Letters Patent of the United States, is—

1. In an electric braking apparatus, a controlling switch, a brake switch, a reversing switch, an interlocking mechanism between the switches, and means arranged to vary the effect of the interlock in accordance with variations of position of one of the switches.

2. In an electric braking apparatus, a controlling switch, a reversing switch, a brake switch, interlocking mechanism between the switches, and means arranged to vary the effect of the interlock in accordance with the position of the reversing switch.

3. In an electric braking apparatus, a controlling switch, a reversing switch, a brake switch, interlocking mechanism between the switches, and means arranged to vary the throw of the brake switch in accordance with the changes of position of the reversing switch.

4. In an electric braking mechanism, a controlling switch, a reversing switch, a brake switch, a stop upon the controlling switch, a bolt actuated by a cam upon the reversing switch and co-operating with the stop, a second stop also upon the controlling switch, a second bolt actuated by a cam upon the brake switch and co-operating with such stop, and an auxiliary cam upon the reversing switch arranged to permit two different degrees of revolution of the braking switch, substantially as described.

5. In an electric braking apparatus, a braking switch provided with contacts and cross-connections adapted to vary the braking effect when running in one direction, and with auxiliary contacts adapted to throw on the brake with full power when running in the opposite direction.

6. In an electric braking apparatus, a resistance-controlling switch for the electric motor, a braking switch, leads connecting the two switches, the motors and the resistance; the braking switch being provided with auxiliary contacts, in circuit while the apparatus propels the car, and out of circuit when the brake is in operation.

In witness whereof I have hereunto set my hand this 8th day of March, 1895.

WILLIAM B. POTTER.

Witnesses:
B. B. HULL,
A. F. MACDONALD